Sept. 10, 1940.　　　H. WILD ET AL　　　2,214,445
INTERNAL COMBUSTION ENGINE
Filed April 19, 1937
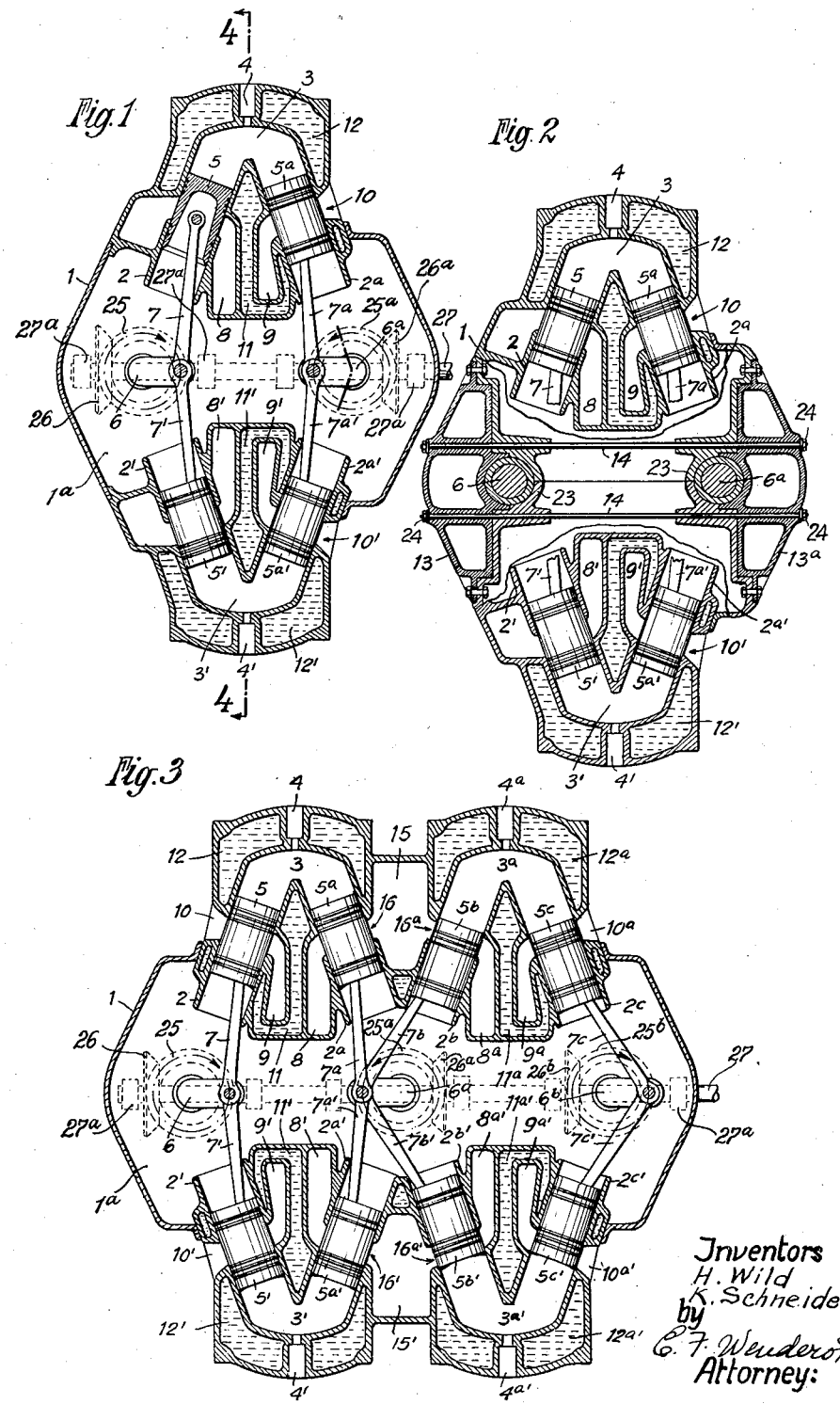
Inventors
H. Wild
K. Schneider
by
C. F. Wenderoth
Attorney Patented Sept. 10, 1940

2,214,445

UNITED STATES PATENT OFFICE 2,214,445

INTERNAL COMBUSTION ENGINE

Hermann Wild and Karl Schneider, Arbon, Switzerland, assignors to Societe Anonyme Adolphe Saurer, Arbon, Switzerland Application April 19, 1937, Serial No. 137,825
In Germany April 25, 1936

5 Claims. (Cl. 123—53)

Our invention relates to improvements in internal combustion engines and more particularly in engines of the type in which two cylinders have a combustion chamber in common, and in which the pistons reciprocating within the said cylinders are connected with separate crank shafts. As is known to those skilled in the art, engines of this type require little room. The object of the improvements is to provide an engine of this type in which the room needed per unit of power is further reduced, and with this object in view our invention consists in combining another pair of cylinders having a combustion chamber in common with the aforesaid cylinders, the axes of all the cylinders being located in the same plane, and one of the pistons of each pair being connected with the same crank shaft. By thus constructing the engine a unit is obtained which is to some extent a duplicate of the known engine, and which comprises four cylinders, the said unit being compact in construction and having high strength as against any strain occurring in service. Further, the weight of the engine per unit of power is small.

For the purpose of explaining the invention two examples embodying the same have been shown in the accompanying drawing, in which the same reference characters have been used in all the views to indicate corresponding parts. In said drawing Figs. 1 and 2 are sectional elevations showing an engine comprising four cylinders, and Fig. 3 is a similar sectional elevation showing an engine with eight cylinders, all cylinders being arranged side by side.

In the example shown in Figs. 1 and 2 the engine comprises a casing 1 provided with two cylinders 2 and 2a having a common combustion chamber 3. Liquid fuel is injected into the said combustion chamber by means of a fuel nozzle 4. Within the cylinders 2 and 2a pistons 5 and 5a are mounted. The axes of the said cylinders and pistons are disposed at an acute angle the apex of which is located slightly above the combustion chamber 3.

The said pistons are connected by connecting rods 7 and 7a respectively with crank shafts 6 and 6a disposed parallel to each other and one beside the other.

Within the angular space provided between the cylinders 2 and 2a passages 8 and 9 are formed, the passage 8 being provided for supplying scavenging and combustion air to the cylinders, and the passage 9 being provided for the delivery of the exhaust gases. The passage 8 is connected with the cylinder 2 through slots which are controlled by the piston 5. The exhaust ports are provided in the wall of the cylinder 2a, and they open into exhaust passages 10 and into the passage 9, the said exhaust ports being controlled by the piston 5a. Between the passages 8 for supplying combustion air and the exhaust passage 9 there is a chamber 11 for cooling water, the said cooling chamber being connected with cooling chambers 12 located around the combustion chamber 3.

The pistons are connected with the crank shafts 6, 6a so that they move simultaneously into and out of the cylinders and the crank shafts rotate in opposite directions, as has been indicated in Fig. 1 by arrows x. At the bottom part of the casing 1 a second pair of cylinders 2' and 2a', and pistons 5' and 5a' are provided the axes of which are located in the same plane as the axes of the cylinders 2, 2a and the pistons 5, 5a. The pistons 5' and 5a' are connected by connecting rods 7' and 7a' respectively with the same crank shafts 6, 6a which are connected with the pistons 5, 5a. Also the cylinders 2', 2a' have a combustion chamber 3' in common, which combustion chamber is provided with a fuel injection nozzle 4', and the cylinders are disposed angularly of each other. Between the said cylinders 2' and 2a' passages 8', 9', and 11' are provided, the passage 8' supplying scavenging and combustion air, the passage 9' being an exhaust passage, and the passage 11' containing cooling water. The piston 5' controls the admission ports for the scavenging, and combustion air, which ports are connected with the passage 8', and the piston 5a' controls the exhaust ports 10'.

By thus combining two pairs of cylinders 2, 2a and 2', 2a' and pistons 5, 5a and 5', 5a' located with their axes in the same plane and acting respectively on the same crank shafts 6 and 6a, a unit is produced which is exceedingly compact, and which has high strength as against any strain occurring in service. The weight per unit of power is small.

By having the crank shafts 6 and 6a rotate in opposite directions the forces exerted within the plane of the crank shafts are largely compensated, and by having two pistons 5, 5' and 5a, 5a' connected by the connecting rods 7, 7' and 7a, 7a' respectively with the same crank shafts 6 and 6a the highest pressure exerted on the bearings is comparatively small. Therefore the said bearings may have small dimensions, which likewise results in a reduction of the weight of the engine.

In Fig. 2 we have illustrated the manner of mounting the crank shafts 6 and 6a. As shown in said figure the said bearings comprise portions 23 which are made integral with the casing 1 and lids 13 and 13a located at opposite sides of the casing 1 and connected with each other and with the portions 23 of the casing 1 by rods 14 extending transversely through the casing 1, the said rods being screw-threaded at their outer ends and carrying nuts 24 for pressing the lids on the casing 1 and on the crank shafts 6 and 6a. The said rods 14 take up the transverse strain exerted by the connecting rods on the crank shafts, and therefore there is no tension in the casing 1 transversely of the axes of the crank shafts. Thus the casing 1 is not subject to alternating tension and pressure, so that it may be constructed with comparatively thin walls which results in a further reduction of the weight of the engine.

Further, by providing the lids 13 and 13a at the sides of the casing 1 and loosely connecting the same with the said casing, the crank shafts 6, 6a and also the pistons and connecting rods may be readily dismounted and mounted. Bevel gears 25, 25a are fixed on the outer ends of the crank shafts 6, 6a. The bevel gears 25, 25a engage bevel gears 26, 26a which are fixed to a common driven shaft 27 being journaled in bearings 27a and transmitting power to the driven parts. In this manner both crank shafts 6, 6a are connected with each other and with the third shaft 27.

In the practice of the invention several units such as are shown in Figs. 1 and 2 may be combined into a single engine, the said units being disposed one beside the other and with their crank shafts 6 and 6a in axial alignment, or one beside the other and with their crank shafts 6 and 6a located parallel to one another. By thus combining several units a combined engine of high power and compact structure is obtained.

Fig. 3 shows an example in which the said crank shafts are parallel to one another, and in which the engine comprises two units, i. e., eight cylinders and pistons which are arranged side by side. As shown both units have their adjacent crank shafts 6a in common, so that the engine comprises three crank shafts which are parallel to one another. Thus the engine comprises two pairs of pistons 5, 5a and 5', 5a' and two crank shafts 6 and 6a, which parts provide the first unit, and in addition two pairs of pistons 5b, 5c and 5b' and 5c' and a third crank shaft 6b connected with the pistons 5c, 5c', the pistons 5b, 5b' being connected with the crank shaft 6a forming a part of the first unit. The pistons 5b and 5c have a common combustion chamber 3a, and the pistons 5b' and 5c' have a common combustion chamber 3a'. The construction of the cylinders 2b, 2c, 2b', 2c' and the passages 8a, 8a' for scavenging and combustion air, the passages 11a, 11a' for cooling water, the passages 9a, 9a' for the exhaust gases, and the exhaust passages 10a, 10a' are similar to the corresponding parts described with reference to Figs. 1 and 2.

Thus, as shown in Fig. 3, an engine is provided which has eight pistons acting on three crank shafts 6, 6a, 6b, the crank shafts being connected with one another and with the driven shaft by means of gear wheels. Also in this construction the crank shafts of each unit rotate in opposite directions, the crank shaft 6 having clockwise movement, the crank shaft 6a anticlockwise movement, and the crank shaft 6b clockwise movement, as is indicated in Fig. 3 by the arrows x.

The scavenging and combustion air is supplied to the cylinders through passages 15, 15' of large cross-sectional area and through ports 16, 16a and 16', 16a'. The outer pistons 5, 5c, 5', 5c' control the exhaust ports 10, 10a and 10', 10a'.

The crank shafts 6, 6a and 6b are connected with the common driven shaft 27 in a similar manner as shown in Fig. 1. Bevel gears 25, 25a, 25b are fixed to the outer ends of the said crank shafts and engage bevel gears 26, 26a, 26b fixed to the common driven shaft 27.

It will be understood that by thus combining several units an engine is produced which has high power and comparatively low weight, and which also has a small number of crank shafts.

Preferably the engines are two-stroke-cycle internal combustion engines.

We claim:

1. A two cycle internal combustion engine particularly suited for airplanes comprising a plurality of units disposed one beside the other, each unit comprising a pair of crank shafts, a pair of pistons having a common combustion chamber connected to said crank shafts, cylinders for said pistons disposed at an acute angle to one another, a second pair of pistons located in the same plane and connected also to said crank shafts, a common combustion chamber for said second pair of pistons, said cylinders being also disposed at an acute angle for said second pair of pistons, a common collection chamber for the scavenging and combustion air of adjacent double pistons, intake slots communicating with said common collection chamber and under the control of adjacent pairs of double pistons.

2. A two cycle internal combustion engine particularly suited for airplanes comprising a plurality of units disposed one beside the other, each unit comprising a pair of crank shafts, a pair of pistons having a common combustion chamber connected to said crank shafts, cylinders for said pistons disposed at an acute angle to one another, a second pair of pistons located in the same plane and connected also to said crank shafts, a common combustion chamber for said second pair of pistons, said cylinders being also disposed at an acute angle for said second pair of pistons, divided bearings provided for said crank shafts and draw rods extending transversely through the engine disconnectably connected to the outer lateral halves of said divided bearings.

3. A two cycle internal combustion engine particularly suited for airplanes comprising a plurality of units disposed side by side, each unit comprising a pair of pistons, separate crankshafts to which said pistons are connected, cylinders for said pistons disposed at an acute angle to one another and communicating with a common combustion chamber, a second pair of pistons located oppositely to said first mentioned pair of pistons in the same plane, said second pair of pistons also being connected to said crankshafts, cylinders for said second pair of pistons being also disposed at an acute angle to one another and communicating with a common combustion chamber, the adjacent pistons of adjacent units acting upon the same crankshaft, passages for the supply and discharge of the scavenging air and of the combustion gases, said passages being disposed at least partially within the space enclosed between said cylinders.

4. A two cycle internal combustion engine particularly suited for airplanes comprising a plurality of units disposed side by side, each unit comprising a pair of pistons, separate crankshafts to which said pistons are connected, cylinders for said pistons disposed at an acute angle to one another and communicating with a common combustion chamber, a second pair of pistons located oppositely to said first mentioned pair of pistons in the same plane, said second pair of pistons also being connected to said crankshafts, cylinders for said second pair of pistons being also disposed at an acute angle to one another and communicating with a common combustion chamber, and the adjacent pistons of adjacent units acting upon the same crankshaft, connecting rods provided for said pistons, the two connecting rods of oppositely disposed pistons engaging the same crank of the common crankshaft and being connected bifurcatedly to one another.

5. A two cycle internal combustion engine particularly suited for airplanes comprising a plurality of units disposed side by side, each unit comprising a pair of pistons, separate crankshafts to which said pistons are connected, cylinders for said pistons disposed at an acute angle to one another and communicating with a common combustion chamber, a second pair of pistons located oppositely to said first mentioned pair of pistons in the same plane, said second pair of pistons also being connected to said crankshafts, cylinders for said second pair of pistons being also disposed at an acute angle to one another and communicating with a common combustion chamber, the adjacent pistons of adjacent units acting upon the same crankshaft, second units disposed beside each of the above units in the same plane, forming with the first mentioned units double-units, a plurality of said double units being disposed in alignment and adjacent pistons of said double-units acting on the same crankshaft.

HERMANN WILD.
KARL SCHNEIDER.